United States Patent [19]

Gardner

[11] 4,123,007
[45] Oct. 31, 1978

[54] VALVE ASSEMBLY AND SPRAYING APPARATUS THEREFOR

[76] Inventor: Charles R. Gardner, 1549 Wilder St., Thousand Oaks, Calif. 91360

[21] Appl. No.: 739,667

[22] Filed: Nov. 8, 1976

Related U.S. Application Data

[63] Continuation-in-part of Ser. No. 714,222, Aug. 13, 1976, abandoned, and Ser. No. 647,688, Jan. 9, 1976, abandoned, said Ser. No. 714,222, is a continuation of Ser. No. 571,456, Apr. 25, 1975, abandoned.

[51] Int. Cl.² .............................................. B05B 7/08
[52] U.S. Cl. .................................. 239/414; 239/416.1; 239/416.4; 239/417.5; 239/419.3; 239/433; 239/527; 239/600
[58] Field of Search ............... 239/306, 311, 314, 407, 239/413, 414, 416.1, 416.4, 417.3, 417.5, 419, 419.3, 422, 424.5, 428, 429, 432, 433, 527, 528, 583, 600, 288.5, 296; 137/605; 285/25, 26, 28, 29

[56] References Cited

U.S. PATENT DOCUMENTS

| | | | |
|---|---|---|---|
| 945,695 | 1/1910 | Colligan | 239/417.3 |
| 1,062,927 | 5/1913 | Roberts | 285/28 |
| 1,463,332 | 7/1923 | Parker et al. | 239/296 |
| 1,990,824 | 2/1935 | Gustafsson | 239/296 |
| 1,990,824 | 2/1935 | Gustafsson | 239/296 |
| 2,619,386 | 11/1952 | Dalrymple | 239/414 |
| 2,786,716 | 3/1957 | Peeps | 239/419 X |
| 2,970,773 | 2/1961 | Keryluk et al. | 239/414 X |
| 2,970,773 | 2/1961 | Keryluk et al. | 239/414 X |
| 3,087,682 | 4/1963 | Peeps | 239/414 |
| 3,096,023 | 7/1963 | Thomas | 239/417.3 X |
| 3,318,530 | 5/1967 | Rhodes | 239/414 X |
| 3,318,530 | 5/1967 | Rhodes | 239/414 X |
| 3,338,523 | 8/1967 | Tibbitt | 239/413 |
| 3,963,180 | 6/1976 | Wagner | 239/288.5 |

Primary Examiner—Evon C. Blunk
Assistant Examiner—Andres Kashnikow
Attorney, Agent, or Firm—Warren T. Jessup

[57] ABSTRACT

Valve assembly which mixes two components for delivery to a spraying apparatus. The assembly is comprised of a core valve mounted in a housing or body which is secured in a chamber in a manner which provides passageways between the housing and the chamber. A fluid is delivered to the core valve by a first conduit attached to the housing, while air is delivered to the chamber by a second conduit coaxial with the first attached to the chamber. The core valve is operated by a plunger or push rod which opens the valve permitting the fluid to enter the chamber and causing it to be mixed internally with the air for delivery to a spraying nozzle device. The valve assembly is operated simultaneously with the valves of the spraying device and may be incorporated into the spraying nozzle device or provided as an attachment thereto.

The valve is also incorporated into a spraying apparatus with an internal fluid mixing chamber which simultaneously mixes two fluids, then delivers mixture to a nozzle for blending with another fluid component. The spraying apparatus is comprised of a gun body with an integral fluid mixing chamber, a nozzle body attached to the gun body, and a nozzle configured to blend two fluid components coming from the nozzle into a uniform spray. The nozzle body is connected to the gun body by a hollow tubular nut, having a threaded nipple as a conduit for delivery of a fluid. The nozzle body has a passageway in communication with the hollow nut for delivering the fluid to a chamber and valve connected to a central aperture of a nozzle removably attached to the nozzle body.

31 Claims, 9 Drawing Figures

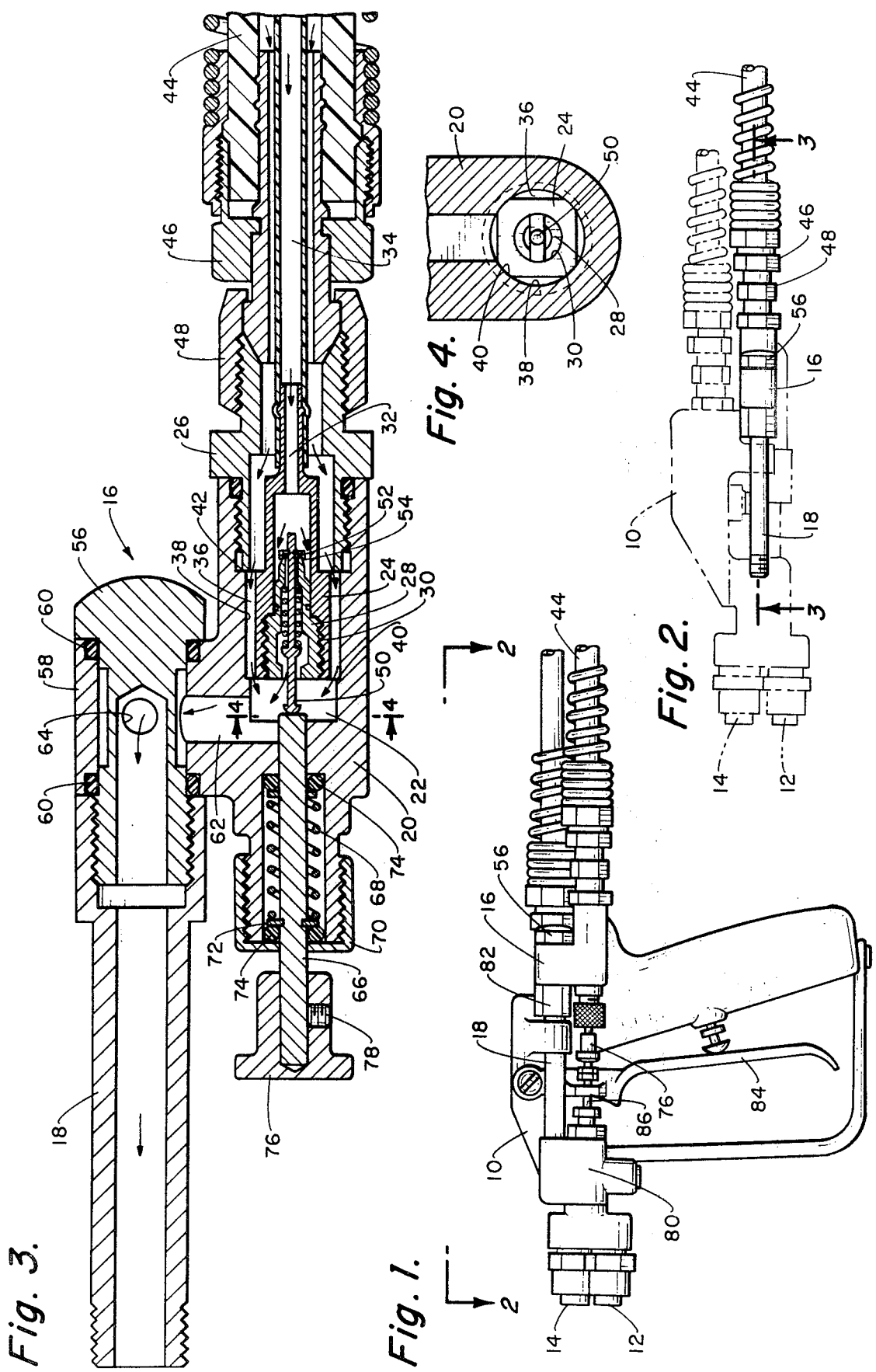

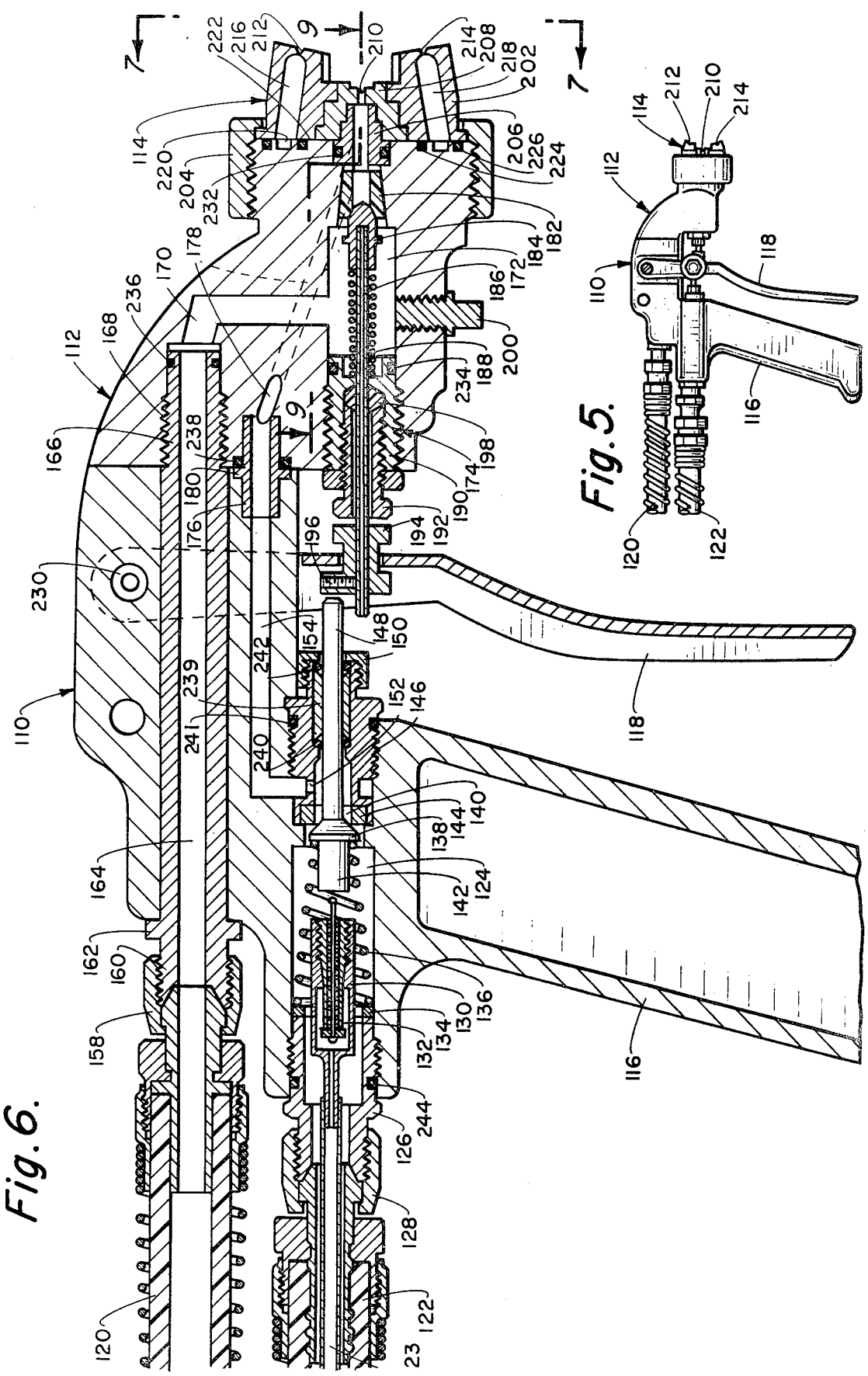

VALVE ASSEMBLY AND SPRAYING APPARATUS THEREFOR

This application is a continuation-in-part of application Ser. No. 714,222, filed Aug. 13, 1976 now abandoned, which was a continuation of Ser. No. 571,456, filed Apr. 25, 1975, now abandoned. This application is also a continuation-in-part of application Ser. No. 647,688, filed Jan 9, 1976, now abandoned.

BACKGROUND OF THE INVENTION

This invention relates generally to a spraying apparatus valve assembly for delivering a component mixture to the spraying nozzle of a spraying device and more particularly relates to a valve assembly and spraying apparatus for mixing and spraying a uniform blend of two or more components.

In the art of devices spraying polyester resins and catalysts to a surface, many methods and processes have been developed over the past years. These devices have been successful to some extent, but they have not been satisfactory for hand-held use in that they have been typically heavy and cumbersome to use. In addition, they are generally very complicated and require extensive maintenance work and care.

In this particular field, it has been a generally accepted practice to apply polyester resins and catalysts via a resin pump, catalyst or injector pump, and an air source to the gun and blend together by internal mixing in the gun nozzle head or external mixing at the surface being coated. In the art of spraying two different methods have emerged. One is low-pressure (under 100 psi) termed "air-atomized" process internally mixed at the gun nozzle in which the catalyst arrives at the gun body from an air atomized injector providing pre-mixed catalyst and air to the gun. The pre-mixed catalyst and air is carried to the gun via suitable hose in an atomized state. The resin and atomized catalysts are then internally mixed through a grid arrangement in the nozzle section of the spray gun. This method requires a purging of all passages including nozzle and body after each use.

The second method uses high pressures and is generally termed "airless". In this system polyester resin is pumped to the spray gun and through an orifice or airless V-jet in the gun nozzle head. Catalyst is also pumped to the nozzle and remains in an airless state, and in some instances requires dilution with a compatible agent. Diluted catalyst allows the use of orifices or V-jets of sufficient size to avoid the frequent problem of plug-ups coming from small particles. The nozzle head has two or more V-jet arrangements to form the necessary spray pattern. The V-jets in the nozzle are directed at an angle toward each other allowing the catalyst and resin to intersect forming a proper spray pattern. In addition to the disadvantages already mentioned, such as high-pressure plug-ups on the nozzle V-jets, the prior art system requires extensive maintenance in order to keep them in suitable condition for continuous use. This requires frequent cleaning in order to prevent hardening of material clogging the passageways. Thus, there is a great need for simplicity of design to reduce maintenance costs and increase the usability of this prior art system.

Also valves for use in spraying devices to mix components for delivery to spray nozzles are known in the art. However, they have not always been satisfactory and in the case of spraying devices for mixing a catalyst with a resin they have been particularly experiencing difficulties. For the latter purpose the present valves mix air with the catalyst for delivery to a nozzle and simultaneous spraying with a resin. However, it has been difficult to obtain a proper mixture of air and catalyst for combination with the resin to produce the desired result. One such prior art device has a dual-valve arrangement in which the air moves a body away from a second orifice permitting the catalyst to mix with the air. While this valve arrangement has achieved some success, it is not suitable for low-pressure requirements because the valve body tends to chatter or vibrate. The present invention solves the problems of prior valves and provides a smooth, easily controlled mixing assembly.

SUMMARY OF THE INVENTION

The purpose of the present invention is to provide a valve assembly which permits controlled mixing of two components and in particular provides controlled mixing of air with a catalyst for delivery to a feed tube.

It is also a purpose of the present invention to provide a spray gun system utilizing the novel valve assembly which is uncomplicated in design and has a minimum of parts, and which is safe, dependable, lightweight and efficient in use.

The rate of flow of the components, such as air, and a catalyst is readily controlled by the push rod acting on the stem of the core valve. One advantage to this valve assembly is that the chamber, housing and core valve can easily be disassembled for cleaning and the core valve can be quickly replaced, if necessary. When the valve assembly is attached to or incoporated in a spraying device, the valves in the spraying device simultaneously operate with the core valve permitting the air-catalyst mixture to be discharged through a nozzle of the spraying device while a resin is simultaneously discharged through a second nozzle. The valve assembly can be mounted in a housing or fitting which is readily adaptable to be attached to all spraying devices in common use today.

The novel valve assembly of the present invention is comprised of a chamber having a valve housing secured internally to provide a passageway between the exterior of the housing and the chamber wall for air to pass through the chamber. In the center of the body is mounted a core or stem valve which releases a component or catalyst into the outlet side of the chamber for mixing with a second component such as air. The flow of air is controlled by a main valve operated by the trigger of a spraying device, while the trigger simultaneously operates a mechanical plunger or push rod to open the core or stem valve.

The spraying apparatus which utilizes the novel valve assembly has an improved method of spraying and applying resins, catalysts, and air, eliminating some of the difficulties and disadvantages of prior systems. Utilizing the advantages of both "air atomized" and "airless" for this purpose the spraying apparatus of this invention is provided with a spray gun body to which a nozzle body is attached. The nozzle body has one valve for delivery of a resin to a removable nozzle, while the gun body has a second valve for delivering a mixture to the nozzle through the nozzle body. This permits valves for delivering the resin and catalyst to be separated and in separate housings so that they may be individually replaced, repaired or cleaned. The mixing chamber in the gun body incorporates features of the novel valve assembly. That is, the gun body has a mixing chamber housing a core valve for delivering the catalyst to the mixing chamber along with a supply of low-pressure air. The air is delivered to the mixing chamber through the outer portion of a coaxial cable and flows into the chamber through apertures in a flange supporting the housing for the core valve. The core valve is operated by a rod attached to the valve for releasing the mixture through the nozzle to the nozzle body.

The nozzle body is secured to the gun body by a hollow tubular nut which has a threaded nipple for attachment of a conduit carrying a resin. The resin flows at medium pressure (800 psi) airless condition through the hollow tubular nut to the nozzle body into a chamber in the nozzle body and then through a first valve to a central aperture of the nozzle. Air and catalyst are delivered to a coaxial cable to the mixing chamber through the core valve and the passageways on the flange surrounding the housing for the core valve. A second valve releases the mixture from the mixing chamber through the gun body to the nozzle body and then to a pair of apertures on opposite sides of the resin aperture in the nozzle. This second valve is simultaneously operated with the first or resin valve and in turn operates the core valve for mixing of the air and catalyst in the mixing chamber. The pair of apertures in the nozzle are angled toward the center airless V-jet apertures so that a uniform spray of low pressure catalyzed mixture intersects the resin close to the nozzle of the spray gun. The three apertures are arranged in the nozzles to produce a fan-like uniformly blended spray of resin and atomized catalyst.

OBJECTS OF THE INVENTION

It is one object of the present invention to provide a valve assembly for efficiently mixing two components.

Another object of the present invention is to provide a valve assembly which can be easily disassembled for repair or replacement.

Another object of the present invention is to provide a valve assembly for mixing two components which operate smoothly and efficiently over a wide range of pressures.

Yet another object of the present invention is to provide a valve assembly for mixing two components which is readily adaptable to existing spray devices.

Still another object of the present invention is to provide a spraying apparatus which is efficient and easy to use.

Another object of the present invention is to provide a spraying apparatus for spraying two or more components which provides separate housings for valves to simplify maintenance and repair problems.

Yet another object of the present invention is to provide a spraying apparatus for spraying two or more components which has a simple and efficient mixing chamber in the gun body.

Still another object of the present invention is to provide a spraying apparatus which utilizes a simple expendable "core valve" for delivering catalyst to the mixing chamber.

Yet another object of the present invention is to provide a spraying apparatus for mixing two or more fluid components in which a removable nozzle provides a uniformly directed spray.

Still another object of the present invention is to provide a spraying apparatus for delivering two or more fluid components that utilize the advantages of applying "airless" resin for complete control and "catalyst air mixture", at low pressure with catalyst being attracted to the fan pattern of resin due to its higher velocity and vacuum at that point, thus avoiding overspray and fumes.

Still another object of the present invention is to provide a spraying apparatus for delivering two or more fluid components which uniformly blends the premixed catalyst and components outside of the spraying gun.

Another object of the present invention is to provide a spraying apparatus for delivering two or more fluid components which requires no purging or flushing means eliminating the fire hazard and expense of solvent.

Other objects, advantages and novel features of the invention will become apparent from the following detailed description of the invention when considered in conjunction with the accompanying drawings.

BRIEF DESCRIPTION OF THE DRAWINGS

FIG. 1 is a side elevation of the mixing valve assembly adapted to a spraying device.

FIG. 2 is a top elevation of the valve assembly taken at line 2—2 of FIG. 1.

FIG. 3 is a sectional view of the valve assembly taken at 3—3 of FIG. 2.

FIG. 4 is a partial sectional view of the valve assembly taken at 4—4 of FIG. 3.

FIG. 5 is a side elevation of the spraying apparatus of the invention.

FIG. 6 is a cross sectional view of the spraying apparatus of FIG. 5.

DETAILED DESCRIPTION OF THE PREFERRED EMBODIMENT

Figure 9:
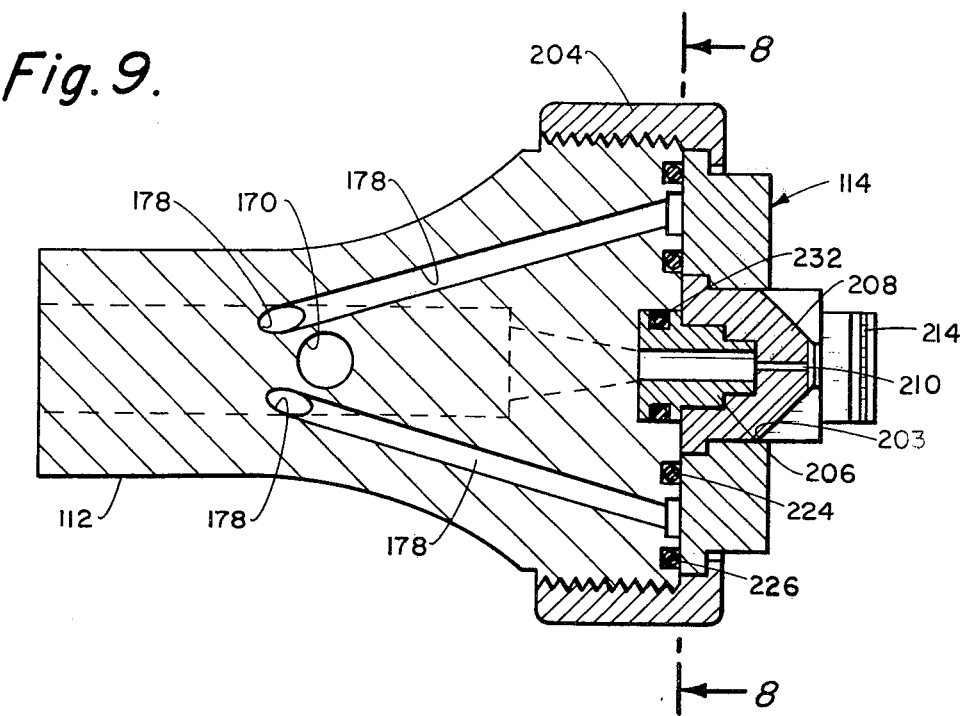
FIG. 9 is a sectional view of the nozzle assembly taken at 9—9 of FIG. 6.

In the manufacture of thermo setting plastic products, a spraying device 10, as shown in FIG. 1, having a pair of nozzles 12 and 14 for simultaneously spraying two components, such as a catalyst and a resin, is required. The amount of catalyst delivered to nozzle 12 is carefully controlled by first mixing it with air in a mixing valve assembly 16 which is the subject of the present invention. The mixing valve assembly 16 is shown in FIGS. 1 and 2 as an attachment to existing spray devices. The heart of the mixing valve assembly is the mixer housing 20 which has a chamber 22 in which is secured a body or valve housing 24, which is securely held in the chamber 22 by a fixture or hose fitting 26. The housing or body 24 has a threaded central bore 30 in which a core or stem operated valve 28 is installed. The opposite end of the housing 24 narrows down to an inlet tube 32 for connecting a hose 34 in line with the core valve 28. The valve housing 24 is shaped to fit the chamber 22, as shown in FIG. 4.

In the sectional view of FIG. 4, the chamber 22 is shown as cylindrical while the housing 24 has a square cross-sectional shape. The chamber 22 is constructed with a ridge 40 against which the corners of the housing 24 abut to securely hold the housing in the chamber 22. Also, the inside diameter of the fitting 26 at 42 is slightly less than the diagonal dimension of the housing 24 so that when the fitting 26 is screwed into the mixing housing 20, the valve housing 24 is secured between the ridge 40 and the end 42 of the fixture 26. Thus, when fitting 26 is removed from the mixing chamber housing 20, the valve housing easily slides out of the chamber 22 and the core valve 28 can be easily removed for cleaning, repair or replacement. Thus the core valve 28 is an expendable valve assembly independent of the housing 20. That is, the expendable valve assembly or core valve 28 can be easily removed and discarded without discarding the housing 20.

Air or a second component is delivered to the chamber 22 through a second hose 44, coaxial with the first hose 34, and attached via fittings 46 and 48. Thus, air or a second component is delivered, as shown by arrows, to the chamber 22 through passageways 36, simultaneously with a catalyst or first component being delivered to the chamber 22 through hose 34 and core valve 28. The core valve 28 is similar to a tire core valve and is operated by a stem 50 which, when moved to the right, displaces a collar 52 from the valve seat 54, permitting the catalyst to flow through the valve into the chamber 22 to be mixed with the air.

In order to adapt this new mixing valve to existing spraying devices, the offset arrangement of the feed tube is provided. The feed tube 18 is connected to a ported bolt 56 fitting in the offset socket portion 58 of the mixing chamber housing 20. The air-catalyst mixture is delivered to the feed tube 18 through a passageway 62, leading to a port 64 in the bolt 56, which is sealed by O-rings 60.

The core valve 28 for delivering the catalyst to chamber 22 is operated by a plunger or push rod 66 engaging the end of the stem 50 of the core valve 28. The plunger 66 is biased by a spring 68 and is secured in the mixer chamber housing 20 by a cap 70 and a split washer 72 installed on grooves in the plunger 66. The push rod mechanism 66 is sealed by O-rings 74 at either end of the spring 68. A button 76 is adjustably attached to the push rod 66 by an Allen screw 78. The Allen screw 78 permits adjustment of the button 76 to compensate for wear on the collar 52 of the core valve 28, if necessary.

For operation with existing spray devices the mixing valve assembly 16 may be attached to an existing spray device 10, for example, as shown in FIG. 1. The feed tube 18 screws into a main valve 80 connected to the nozzle 12. In most cases the feed tube 18 is an existing part of spraying devices and has a hexagonal threaded end 82 for attachment of a hose fitting. In this case the ported bolt 56 screws into the hex end 82 of the feed tube 18, as can be more clearly seen in FIG. 3. Nozzle valve 80 is operated by a trigger 84 which moves rod 86 in and out. The button 76 on the valve assembly 16 is positioned to engage the end of the rod 86 when the trigger 84 is operated. In operation, trigger 84 moves rod 86, opening valve 80, permitting air to flow through valve assembly 16 to the nozzle 12. Simultaneously with the opening of valve 80, a valve (not shown) is opened to permit resin to flow to nozzle 14. In addition, the trigger 84 simultaneously operates plunger 66 to open core valve 28, allowing the air flowing around valve housing 24 to mix with the catalyst in chamber 22 to produce a mist which is then discharged through valve 80 and nozzle 12.

The valve assembly 16 allows two or more fluids from separate sources to blend or mix together in chamber 22 for application by a spray device 10, commonly used in the industry. The valve assembly described allows two or more fluids or components to be mixed together prior to delivery to a primary valve 80 and controlled by this valve. The principle of simultaneous operation of the valve assembly 16 permits it to be used either fore or aft of the primary valve 80 or in tandem. In the embodiment shown in FIG. 3, the casing or mixing chamber housing 20 encloses a valve housing 24 of square or other irregular shape, which is installed in the cylindrical conduit or chamber 22 creating equal passages 36 for the first component (i.e. compressed air) to flow through. While the valve housing 24 is shown as square and the chamber 22 as cylindrical, obviously other shapes would be suitable. That is, the chamber could be square and the housing cylindrical, or the housing could have only one flat surface between a curved surface of a chamber. It is only necessary that the exterior shape of the valve housing 24 and the interior shape of the chamber 22 be such that when the housing 24 is installed there will be one or more passages of sufficient size to permit free flow of air between the housing and the interior wall of the chamber 22.

With the valve assembly shown there is no need for adding diluting agents to a catalyst, such as methyl, ethyl, ketone, peroxide (MEKP) with ethyl acetate or the like to achieve proper percent of catalyzation with the resin and additionally a suitable spray pattern can be obtained with optimum pressure. The present invention also allows the blending of compressed air at low pressure with straight (60%) undiluted MEKP. This results in proper percentage and uniform catalyzation over a uniform spray pattern. This valve assembly also eliminates the fire hazards of MEKP and ethyl acetate, particularly when blended together, providing a safer working environment for the industry as a whole. The concentric valving of the two components and the valve housing and chamber also permits straight line flow permitting use of coaxial hose offering the advantages of a single hose rather than the more common two-hose arrangement. Also, this valve assembly can be adapted to or built into spray devices having two or more nozzles, if desired.

A spraying device having the valve assembly built in as shown in FIG. 5 and is comprised of a gun body 110 to which a nozzle body 112 is attached having a removable nozzle 114. The gun body 110 has a handle 116 and a trigger 118. Conduits 120 and 122 deliver the fluid components usually polyester resin, catalyst and air. The nozzle 114 delivers fan-like sprays of catalyst and resin to produce a planar spray which will cover a broad area when the plane is perpendicular to the direction in which the spraying gun is being moved or will produce a relatively thin line when the plane is parallel to the direction of movement of the spraying gun.

The sectional view of FIG. 6 illustrates the relatively uncomplicated nature of the spraying apparatus which delivers resin and catalyst to the nozzle and also mixes the catalyst with air in the body 110 of the gun. Conduit 122 is a coaxial type which simultaneously delivers air and catalyst to a mixing chamber 124 in the gun body 110. Conduit 112 attaches to the gun body by a threaded nipple 126 internally threaded into the gun body and externally attaching to a coupling 128 on the coaxial conduit 122. A core valve 132 is threaded into the housing in the same manner as was discussed with respect to the add-on valve assembly above.

The housing 130, however, is secured in the mixing chamber 124 by a flange 134 which butts against the internal end of nipple 126. A spring 136 biased against the flange 134 maintains the housing 130 securely in place. The opposite end of spring 136 is biased against a flange 138 which is a part of valve 140. A rod or post 142 maintains the spring 136 in position between the housing 130 and the valve 140. The valve 140 has a resilient valve seat 144 engaging the flange 138.

The valve 140 formed by valve seat 144 and flange 138 are all supported in a threaded valve housing 146. The valve 140 is operated by a plunger 148 passing through the valve housing 146 which is sealed externally by a cap 150. The valve housing 146 has a passageway 152 for releasing the mixture from mixing chamber 124 to passageway 154. The valve housing 146 has an undercut portion in the area of the aperture 152.

The resin conduit 120 is attached to the gun body 110 by a coupling 158 which screws onto the threaded nipple 160 of elongate hollow nut 162. The elongate hollow nut 162 provides a passageway 164 to the nozzle body 112. The other end of the hollow elongate nut 162 has a threaded end 166 which screws into a tapped hole 168 in the nozzle body 112. The passageway 164 is thus in communication with passageway 170 in the nozzle body which delivers resin to a chamber 172, for delivery to a nozzle head assembly 114 through the resin valve assembly 174. When the nozzle body 112 is attached to the gun body 110 by threading into the nut 162, a hollow bushing 176 aligns and seals the catalyst mixture passageway 154 with passageway 178 in the nozzle body 112. A flange 180 on the bushing 176 seals the catalyst mixture passageway 154 and 178.

Valve assembly 174 is comprised of a valve seat 182 and plug 184 attached to a shaft 186 for operating the valve. The plug 184 is bias closed by a spring 188 between the plug 184 and a valve housing 190 threaded into the nozzle body 112. A threaded bushing 192 holds a Teflon seal 198 in the interior of the housing 190 for sealing around a shaft 186. An adjustable trigger pull bushing 194 is secured to the shaft 186 by a screw 196. Flanges on either end of bushing 194 are engaged by the trigger 118 for operating the resin valve assembly 174. This bushing 194 also engages the shaft 148 for operating valve 140 and core valve 132. A clean-out plug 200 is provided in the nozzle body 112 for purging chambers 170 and 172 of collected resin.

Figure 7:
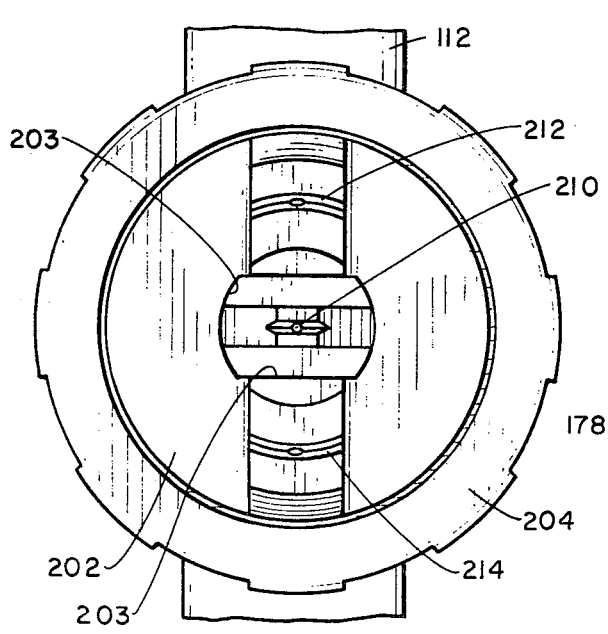
FIG. 7 is a view taken at 7—7 of FIG. 6.
Figure 8:
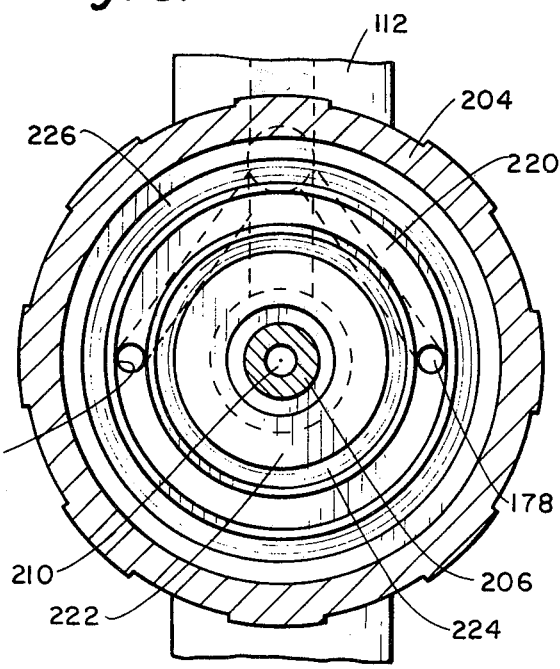
FIG. 8 is a view taken at 8—8 of FIG. 9.

The nozzle assembly 114 is comprised of a nozzle head 202 secured to the nozzle body 112 by a lock nut 204. Secured between the nozzle head 202 are a pair of bushings 206 and 208 providing passageways communicating with the nozzle resin valve assembly 174. Thus, the nozzle assembly 114 has two parts, a catalyst head 202 and a resin head 208 which may be removed and separately replaced, if desired. The resin head 208 has centrally located aperture in the form of a V-jet which is shown more clearly in FIG. 7, 210. The catalyst head 202, however, has a pair of extended jet openings 212 and 214 for spraying a catalyst mixture into the resin spray. Thus, passageways 216 and 218 communicating respectively with said openings 114. The catalyst mixture is delivered to a circumferential or circular recess 220 in the face 222 of the nozzle body 112 by passageway 178. O-ring seals 224 and 226 seal the catalyst passageways.

The trigger 118 is hinged at 230 which is a pin attachment to the gun body 110. In operation air and catalyst are delivered through the conduit 122 to the mixing chamber 124 with the catalyst being supplied through the central conduit 123 and air flowing around the housing 130 into the chamber 124. When the trigger 118 is operated, it forces plunger 148 to the left, opening valve 140 and core valve 132, thus releasing catalyst to the chamber 124 for mixing and at the same time allowing the mixture to flow into passageway 154. At the same time, trigger 118 opens, resin valve assembly 174 releases resin delivered through conduit 120 and hollow nut 162 to the nozzle assembly through nozzle body 212. As can be seen from FIG. 7, the jets 210, 212 and 214 of the nozzle assembly 114 are like V-jets which produce a fanshaped spray with the catalyst mixture intersecting the resin at a point close to the exit point from the nozzle assembly 114. This action produces a blended, uniform spray for coating the surface being sprayed.

The center nozzle 208 for the resin is keyed or indexed to the outer nozzle 202 for the catalyst by a slotted hole 203 engaging the flat sides of the resin nozzle. Thus, whenever the entire nozzle 114 assembly is rotated on the gun, the V-jet 210 of the resin nozzle 208 will always remain parallel with the V-jets 212, 214 of the catalyst nozzle 202. Thus, rotation of the nozzle assembly to change the spray pattern from horizontal to vertical will maintain the fan patterns substantially parallel.

Without the keying of the resin nozzle 208 to the catalyst nozzle 202, removal and replacement of the resin nozzle would cause difficulty in aligning the fan pattern produced by the V-jets. The keying eliminates the need for adjusting the resin nozzle to the fan pattern of the catalyst nozzle. In some prior art spray guns this has been a problem.

Appropriate O-rings are provided with each valve assembly and at the mating points of the nozzle body 112 with the gun body 110 in the usual manner, such as is shown at 232 for the nozzle assembly 234 for the resin valve assembly 236 for the resin hollow nut 162 and 238 for the catalyst mixture bushing 176 for attaching the nozzle body 112 to the gun body 110. O-rings 238, 240 and 242 seal the catalyst mixture valve 140. O-rings 244 seal the coaxial conduit nipple 126 to the gun body 110.

The spray gun does not require an atomized-type injector vessel. Undiluted catalyst may be delivered to the gun via the coaxial hose arrangement 122 from a container (not shown) having a flow meter attached. The inner hose 123 carrying catalyst, the outer hose carrying regulated air. These two components arrive at the gun body 110 and are mixed together simultaneously in the core valve assembly and mixing chamber 124 within the gun body 110. From the mixing chamber 124 it is then led forward through a single hole to the gun nozzle 114 and is applied through two orifices 212 and 214, at 10° angles to the resin in a fan pattern both below and above the resin fan pattern. The nozzle may be rotated with resin V-jet 210 remaining in place so that the fan pattern and catalyst are always in proper relation to each other. In the case of applying gel coat resins, it is an advantage to be able to rotate the complete gun nozzle for best pattern position.

Resin is pumped to the gun used in an airless method. Pressures may be as low as 450 pounds to 3500 pounds. The common airless V-jet is used at the nozzle and orifice size is determined by the gun operator.

In the above sequence, it is quite simple to effect perfect catalyzation by use of two air regulators — one to govern the amount of air used to mix and spray, and the other to regulate the pressure above the catalyst in the container having a flow meter attached. This arrangement eliminates delay in a blended mixture arriving immediately at the spray nozzle. Due to the unique design, assembly and disassembly takes just minutes as the catalyst valve is an expendable, easily accessible core valve assembly.

While most spray guns involve three or four hoses to operate, this improved method uses only two and no solvent flushing means is required which in itself presents quite a saving.

A feature best suited to safety of operation is the advantage of low-pressure resin being sprayed airless and, of course, the catalyst also being applied at low pressures of around 12 to 20 pounds with no overspray fumes. Catalyst air mixture is drawn at 10° toward the resin fan pattern, by the velocity of the resin flow. Thus, catalyst overspray is avoided.

Obviously, many modifications and variations of the invention are possible in light of the above teachings. It is therefore to be understood that the full scope of the invention is not limited to the details disclosed herein and may be practiced otherwise than as specifically described.

What is claimed is:

1. Apparatus for mixing two components comprising:
a chamber having an inlet and an outlet;
a housing secured in said chamber;
at least one passageway between the exterior of said housing and the interior of said chamber;
said housing having a bore;
an expendable valve assembly installed in said bore, said expendable valve assembly being independent of said housing;
mechanical means for opening and closing the valve in said expendable valve assembly;
first conduit connecting means on said housing for delivering a first component to said expendable valve assembly at the inlet side of said chamber;
second conduit connecting means for delivering a second component to the inlet side of said chamber;
whereby opening of the valve in said expendable valve assembly causes the two components to be mixed in said chamber for delivery to the outlet.

2. The apparatus according to claim 1 wherein:
said chamber is cylindrical; and
portions of the exterior of said housing are flat;
whereby passageways are formed between the flat portions of said housing and the cylindrical chamber.

3. The apparatus according to claim 2 wherein the cross-sectional area of said housing perpendicular to the axis of said cylindrical chamber is square.

4. The apparatus according to claim 1 wherein:
said expendable valve assembly is a core valve; and
said mechanical means for opening and closing said valve is a push rod adapted to engage the end of a stem in said core valve.

5. The apparatus according to claim 4 wherein:
the bore in said housing is a central threaded bore; and
said core valve is threaded into said bore.

6. The apparatus according to claim 1 wherein:
said first and second connecting means are adapted to permit attachment of a coaxial conduit.

7. The apparatus according to claim 1 wherein:
said housing is removable from said chamber whereby said valve may be readily replaced.

8. The apparatus according to claim 7 wherein:
said second conduit connecting means is a fitting removably attached to the inlet side of said chamber; and said housing is secured in the chamber by attachment of said fitting.

9. In a spray device for simultaneously spraying a plurality of components in which said spray device has a plurality of spray nozzles and a trigger for simultaneously opening valves to said nozzles and having conduits for delivering components for spraying through said nozzles the improvement comprising:
apparatus according to claim 1 for delivering a component mixture to one of said nozzles through one of said valves.

10. A spray device according to claim 9 wherein:
said trigger of said spraying device is adapted to operate the valve in the expendable valve assembly of the mixing apparatus simultaneously with one of said valves to said spray nozzles.

11. A spray device according to claim 9 wherein said mixing apparatus is adapted to attach to a passageway to one of said valves of said spray device, whereby said mixing apparatus may be attached to existing spray devices.

12. A spray gun for simultaneously spraying a plurality of fluid components comprising:
a gun body having a handle and a trigger,
a nozzle assembly attached to said gun body,
a plurality of connecting means for connecting a plurality of fluid components to said gun body,
a plurality of passageways in said gun body communicating from said plurality of connecting means to said nozzle assembly,
a chamber in said gun body in communication with one of said passageways,
a housing secured in said chamber,
at least one passageway between the exterior of said housing and the interior of said chamber,
a bore in said housing,
an expendable valve assembly installed in said bore, said expendable valve assembly being independent of said housing,
mechanical means for opening and closing the valve in said expendable valve assembly upon operation of said trigger,
first conduit connecting means on said housing for delivering a first component to said expendable valve assembly,
second conduit connecting means for delivering a second component to said at least one passageway between the exterior of said housing and the interior of said chamber,
valve means for opening and closing the passageways through said nozzle assembly for spraying said plurality of components,
means operatively connecting said trigger to said valve means for opening and closing said valve means,
whereby opening of the valve in said expendable valve assembly causes said first and second components to be mixed in said chamber for delivery to said nozzle assembly through one of the passageways in said gun body.

13. The spraying apparatus according to claim 12 wherein said nozzle assembly includes a nozzle comprising;
a central aperture receiving said first component;
a pair of apertures on opposite sides of said central aperture receiving said mixture;

said pair of apertures adapted to combine said mixture with said first component at a predetermined distance beyond the end of said nozzle.

14. The spraying apparatus according to claim 13 wherein:
said apertures in said nozzle are adapted to provide a planar fan-like spray; and
said pair of apertures have delivery tubes at a predetermined angle to said central aperture whereby the mixture exiting from the pair of apertures intercepts the fluid from the central aperture.

15. The spraying apparatus according to claim 13 wherein said nozzle is removably attached to a nozzle assembly.

16. The spraying apparatus according to claim 15 wherein said nozzle assembly has a circular recess in communication with said pair of nozzle apertures whereby said mixture is uniformly delivered to said apertures.

17. The spraying apparatus according to claim 13 wherein:
said pair of apertures comprises jets in a first nozzle attachment; and
said central aperture comprises a jet in a second nozzle attachment engaging the first nozzle attachment.

18. A spray gun according to claim 17 wherein the second nozzle attachment is keyed to the first nozzle attachment whereby both nozzle attachments rotate together maintaining the orientation of the respective jets constant.

19. The spray gun according to claim 18 wherein the second nozzle attachment is keyed to the first nozzle attachment by having an aperture in the first nozzle attachment which has at least one flat side coincident with a flat surface on the second nozzle attachment.

20. The spraying apparatus according to claim 12 wherein said gun includes:
a hollow tubular nut means connecting said nozzle assembly to said gun body;
said hollow tubular nut means including connecting means for connecting one of said fluid components.

21. The spraying apparatus according to claim 20 including alignment means for aligning a fluid passageway of the gun body with a corresponding fluid passageway of said nozzle assembly.

22. The spraying apparatus according to claim 21 wherein said aligning means comprises:
a hollow tubular member seated in said fluid passageway of said gun body and having an extension seated in a corresponding fluid passageway of said nozzle assembly.

23. The spraying apparatus according to claim 22 wherein said hollow tubular member has a flange seat engaging a counterbore for sealing the fluid passageways between said gun body and said nozzle assembly.

24. The spraying apparatus according to claim 12 wherein said mechanical means comprises:
a rod attached to one of said valve means for operating said expendable valve assembly simultaneously with said valve means.

25. The spraying apparatus according to claim 12 wherein said housing is secured in said chamber by a flange on the exterior of the housing engaging the end of said second conduit;
said housing being held in position by a spring biased between said flange and one of said valve means.

26. The spraying apparatus according to claim 25, wherein at least one said passageway between the exterior of said housing and the interior of said chamber comprises:
one or more apertures in the flange on said housing.

27. The spraying apparatus according to claim 12 wherein said expendable valve assembly comprises;
a core valve mounted in said housing.

28. A nozzle jet assembly comprising:
at least one nozzle jet adapted to spray a fluid component in a substantially planar fan-shaped pattern;
a second nozzle jet adapted to spray a fluid component in a substantially planar fan-shaped pattern;
mounting means mounting said nozzle jets whereby the fan-shaped patterns from each jet intersect each other at a predetermined distance beyond the nozzle jets for mixing;
said mounting means comprising:
a nozzle body having a plurality of passageways for delivery of a plurality of fluid components to said nozzle jets,
an annular groove in said nozzle body in communication with said passageways and said at least one jet,
a bore located inside said annular groove in communication with said passageways and said second jet, interlocking means for interlocking the jets
so that the fan-shaped pattern produced by the two jets may be simultaneously rotated to any desired angle without affecting the orientation of the fan-shaped pattern from each jet;
whereby communication between said nozzle body and said nozzle jets is maintained constant regardless of the angular orientation of said jets.

29. The nozzle jet assembly according to claim 28 wherein said at least one nozzle jet comprises:
a pair of nozzle jets angularly disposed on opposite sides of a circumference whereby the spray pattern from each intersects at a predetermined distance from said nozzle jets.

30. The nozzle jet assembly according to claim 29 wherein said second nozzle jet is disposed between said pair of nozzle jets.

31. The nozzle jet assembly according to claim 30 wherein said interlocking means comprises:
a central bore between said pair of jets, having at least one flat side,
a flat side on said second jet engaging the flat side of said bore whereby said two nozzles are restrained in a predetermined orientation.

* * * * *